US012415221B2

(12) United States Patent
Addis et al.

(10) Patent No.: US 12,415,221 B2
(45) Date of Patent: Sep. 16, 2025

(54) METHOD OF MANUFACTURING A RIFLE SCOPE MOUNT

(71) Applicant: Area 419 Firearms, LLC, Delta, OH (US)

(72) Inventors: Jon Addis, Whitehouse, OH (US); Craig Arnzen, Perrysburg, OH (US)

(73) Assignee: AREA 419 FIREARMS, LLC, Delta, OH (US)

( * ) Notice: Subject to any disclaimer, the term of this patent is extended or adjusted under 35 U.S.C. 154(b) by 0 days.

(21) Appl. No.: 18/827,629

(22) Filed: Sep. 6, 2024

(65) Prior Publication Data

US 2025/0083236 A1 Mar. 13, 2025

Related U.S. Application Data

(60) Provisional application No. 63/537,143, filed on Sep. 7, 2023.

(51) Int. Cl.
*B23B 35/00* (2006.01)
*F41G 11/00* (2006.01)

(52) U.S. Cl.
CPC ............ *B23B 35/00* (2013.01); *F41G 11/003* (2013.01)

(58) Field of Classification Search
CPC ........ F41G 11/003; B23P 13/02; B23P 15/00; B23P 15/02; B23B 35/00; F16M 13/02; F16B 2/065
USPC .......... 248/229.2, 230.1, 316.1, 316.6, 316.8
See application file for complete search history.

(56) References Cited

U.S. PATENT DOCUMENTS

| | | | | |
|---|---|---|---|---|
| 3,724,800 A | * | 4/1973 | Rubin | F41G 11/001 D22/110 |
| 5,522,166 A | * | 6/1996 | Martel | F41G 11/003 42/127 |
| 8,151,508 B1 | * | 4/2012 | Moore | F41G 11/001 42/124 |
| 10,352,658 B1 | * | 7/2019 | Aslin | F41G 11/003 |
| 2007/0266611 A1 | * | 11/2007 | Stover | F41G 11/004 42/124 |
| 2011/0094136 A1 | * | 4/2011 | Zimmerman | B21C 23/14 42/6 |
| 2017/0205200 A1 | * | 7/2017 | Geissele | F41G 1/393 |

* cited by examiner

*Primary Examiner* — Sarang Afzali
*Assistant Examiner* — Darrell C Ford
(74) *Attorney, Agent, or Firm* — Bennet K. Langlotz; Langlotz Patent & Trademark Works, LLC

(57) ABSTRACT

A method of manufacturing a rifle scope mount has the steps of forming a first mount portion defining a first portion of a cylindrical scope tube passage, forming a second mount portion defining a second portion of the cylindrical scope tube passage, after forming the first and second mount portions, connecting the first and second mount portions together, connecting the first and second mount portions to a fixture, and after connecting the first and second mount portions to a fixture, machining the first and second mount portions to define a cylindrical bore at the cylindrical scope tube passage. The step of connecting the first and second mount portions together may include positioning a shim between the first and second mount portions. The step of connecting the first and second mount portions to a fixture may include clamping the first mount portion to a fixture rail.

14 Claims, 12 Drawing Sheets

METHOD OF MANUFACTURING A RIFLE SCOPE MOUNT

CROSS-REFERENCE TO RELATED APPLICATION

This application claims the benefit of U.S. Provisional Patent Application No. 63/537,143 filed on Sep. 7, 2023, entitled "TACTICAL SCOPE MOUNT," which is hereby incorporated by reference in its entirety for all that is taught and disclosed therein.

FIELD OF THE INVENTION

The present invention relates to firearms, and more particularly to a method of manufacturing a rifle scope mount that enables precision manufacturing of a rifle scope mount.

BACKGROUND AND SUMMARY OF THE INVENTION

The prevalence of magnified optics in precision marksmanship is at an all-time high. As optics become more sophisticated and rifles or other hosts become more precise, the means to mount those optics to their hosts must also become more exacting. The addition of certain high-precision accessories like laser rangefinders or designators is also an important consideration to any optical mount.

Therefore, a need exists for a new and improved method of manufacturing a rifle scope mount that enables precision manufacturing of a rifle scope mount. In this regard, the various embodiments of the present invention substantially fulfill at least some of these needs. In this respect, the method of manufacturing a rifle scope mount according to the present invention substantially departs from the conventional concepts and designs of the prior art, and in doing so provides an apparatus primarily developed for the purpose of enabling precision manufacturing of a rifle scope mount.

The present invention provides an improved method of manufacturing a rifle scope mount, and overcomes the above-mentioned disadvantages and drawbacks of the prior art. As such, the general purpose of the present invention, which will be described subsequently in greater detail, is to provide an improved method of manufacturing a rifle scope mount that has all the advantages of the prior art mentioned above.

To attain this, the preferred embodiment of the present invention essentially comprises the steps of forming a first mount portion defining a first portion of a cylindrical scope tube passage, forming a second mount portion defining a second portion of the cylindrical scope tube passage, after forming the first and second mount portions, connecting the first and second mount portions together, connecting the first and second mount portions to a fixture, and after connecting the first and second mount portions to a fixture, machining the first and second mount portions to define a cylindrical bore at the cylindrical scope tube passage. The step of connecting the first and second mount portions together may include positioning a shim between the first and second mount portions. The step of connecting the first and second mount portions to a fixture may include clamping the first mount portion to a fixture rail. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

Figure 1:
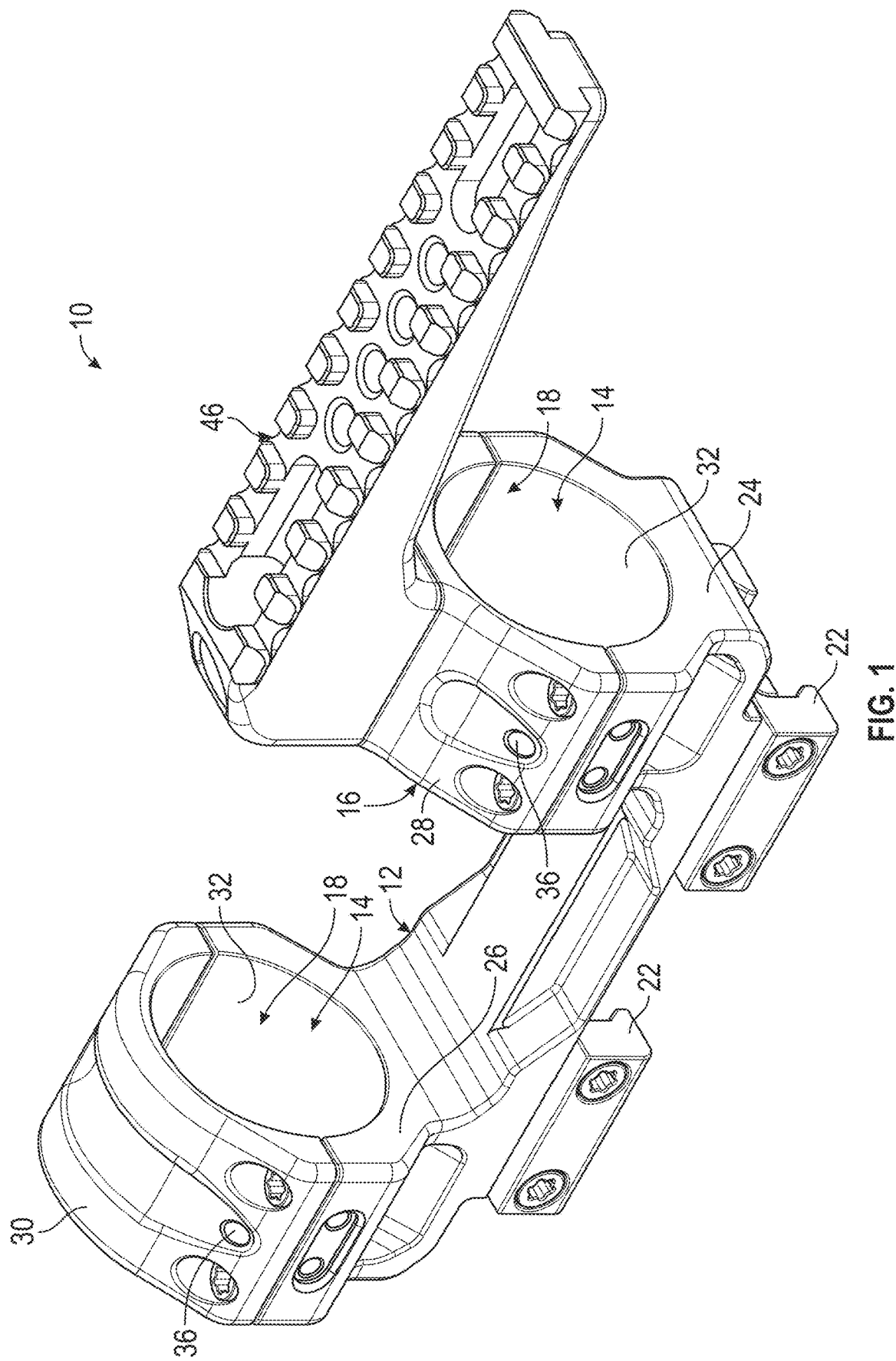
FIG. 1 is a top isometric view of the current embodiment of a rifle scope mount constructed in accordance with the principles of the present invention.
Figure 2:
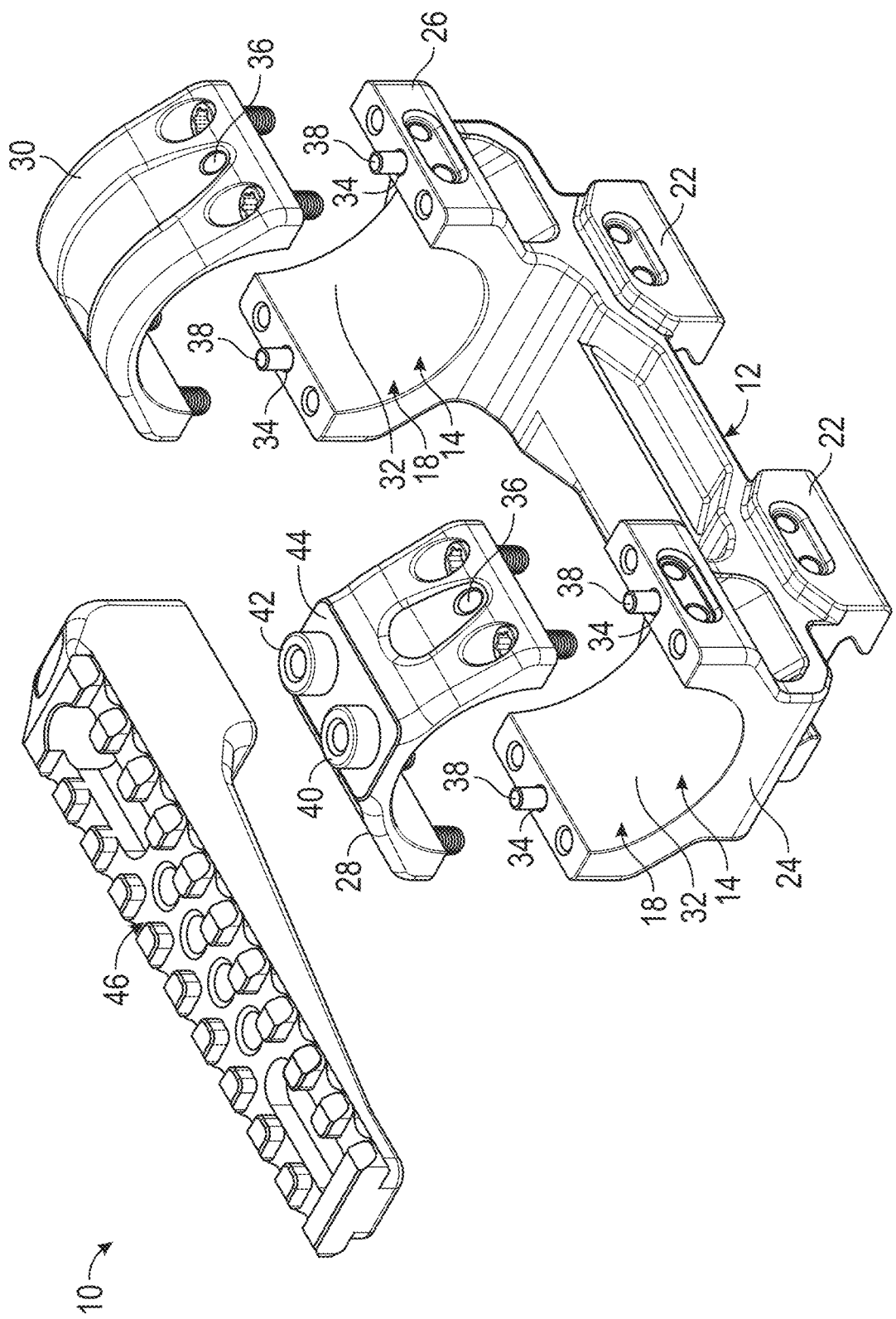
FIG. 2 is an exploded view of the rifle scope mount of FIG. 1.
Figure 3:
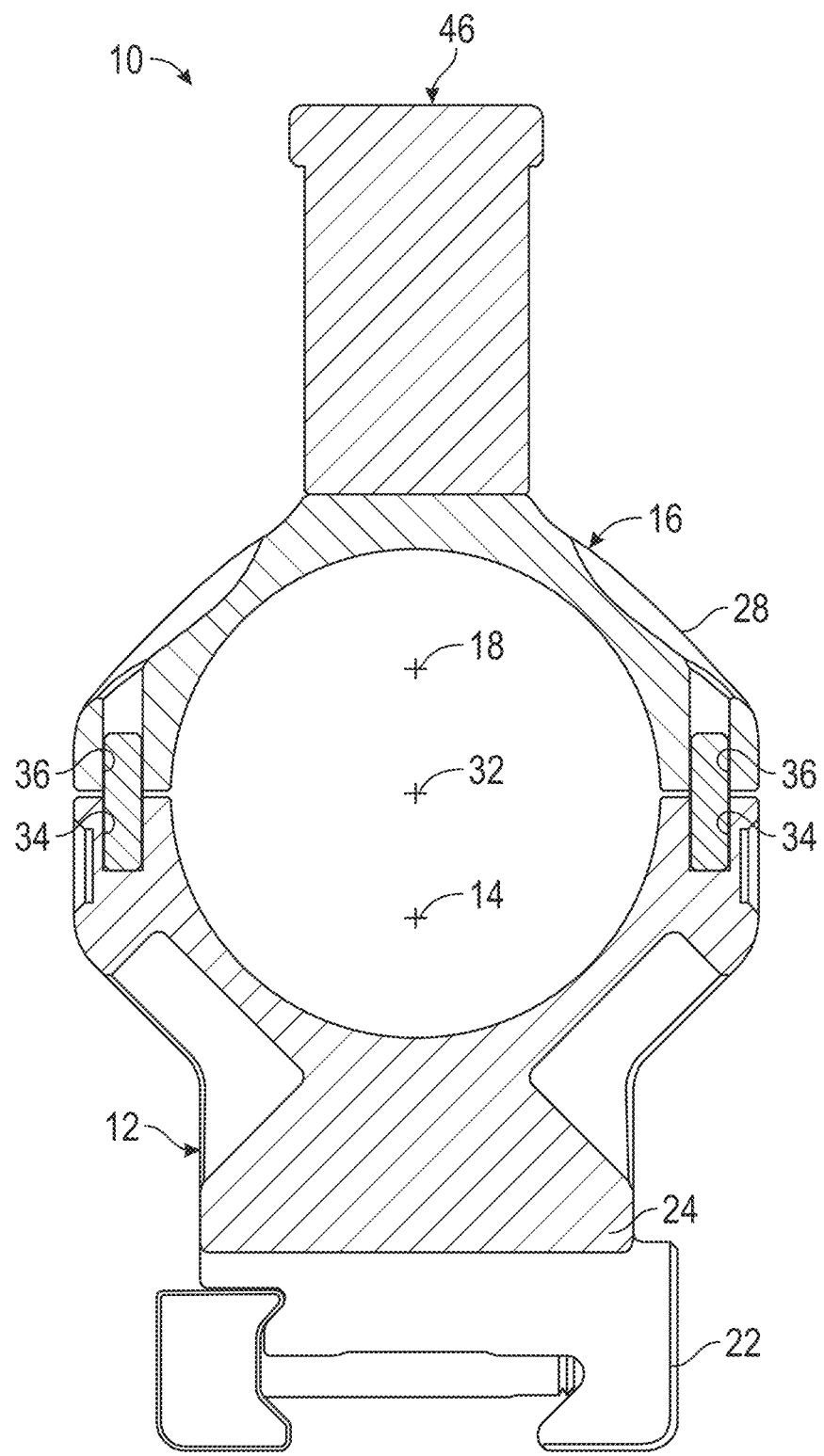
FIG. 3 is a cross-sectional view of the rifle scope mount of FIG. 1.
Figure 4:
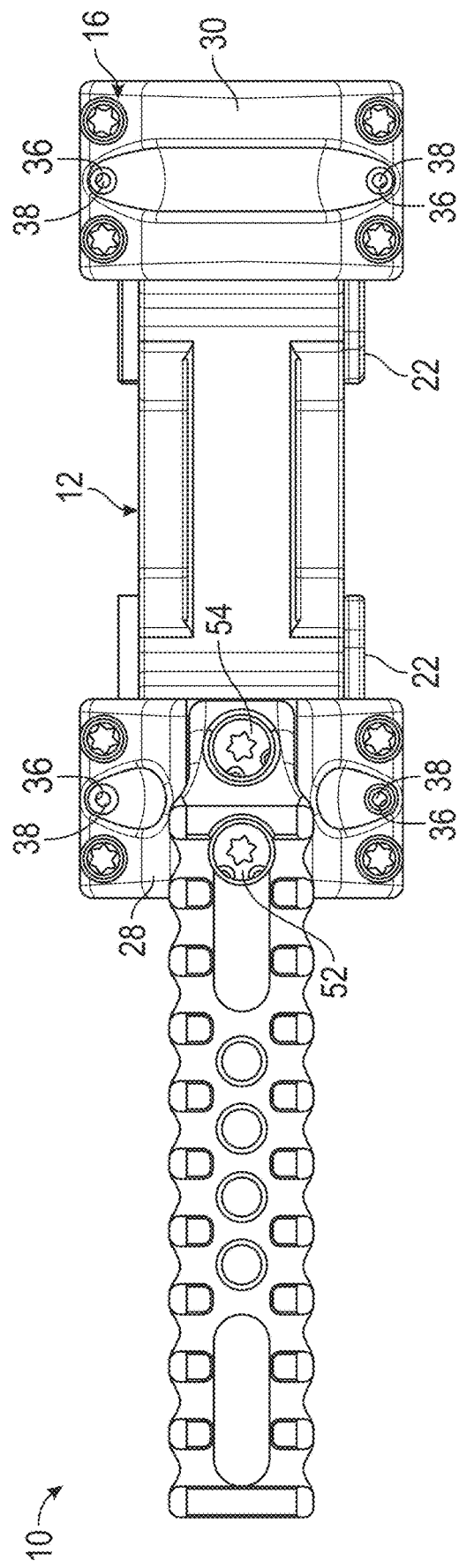
FIG. 4 is a top view of the rifle scope mount of FIG. 1.

An embodiment of the method of manufacturing a rifle scope mount of the present invention is shown and generally designated by the reference numeral 100.

FIGS. 1-4 illustrate the improved rifle scope mount 10 of the present invention. More particularly, the rifle scope mount has a first mount portion 12 defining a first portion of a cylindrical scope tube passage 14. The rifle scope mount also has a second mount portion 16 defining a second portion of the cylindrical scope tube passage 18. The first mount portion is clamped to a fixture rail 20 during machining (shown in FIGS. 9-12), which is in the form of a picatinny rail in the current embodiment. The first mount portion is a base including a clamp 22 operable to mount to a firearm. The first mount portion also includes a forward scope ring cradle 24 and a rear scope ring cradle 26. The second mount portion is at least one scope ring cap and preferably a forward scope ring cap 28 and a rear scope ring cap 30. In the current embodiment, surfaces of the first and second mount portions are treated including anodizing. It should be appreciated that subsequent machining of the first and second mount portions occurs to define a cylindrical bore 32 at the cylindrical scope tube passage that leaves uncoated contact surfaces for improved grip on a rifle scope of sighting device subsequently installed in the cylindrical bore.

The first and second mount portions 12, 16 each define a registration hole 34, 36. An elongated registration pin 38 is positioned in the registration holes. In the current embodiment, the registration holes are of different sizes such that the elongated registration pin is more readily removed from one registration hole than the other registration hole. Preferably, the registration holes in the second mount portions are larger than the registration holes in the first mount portions.

Figure 5:
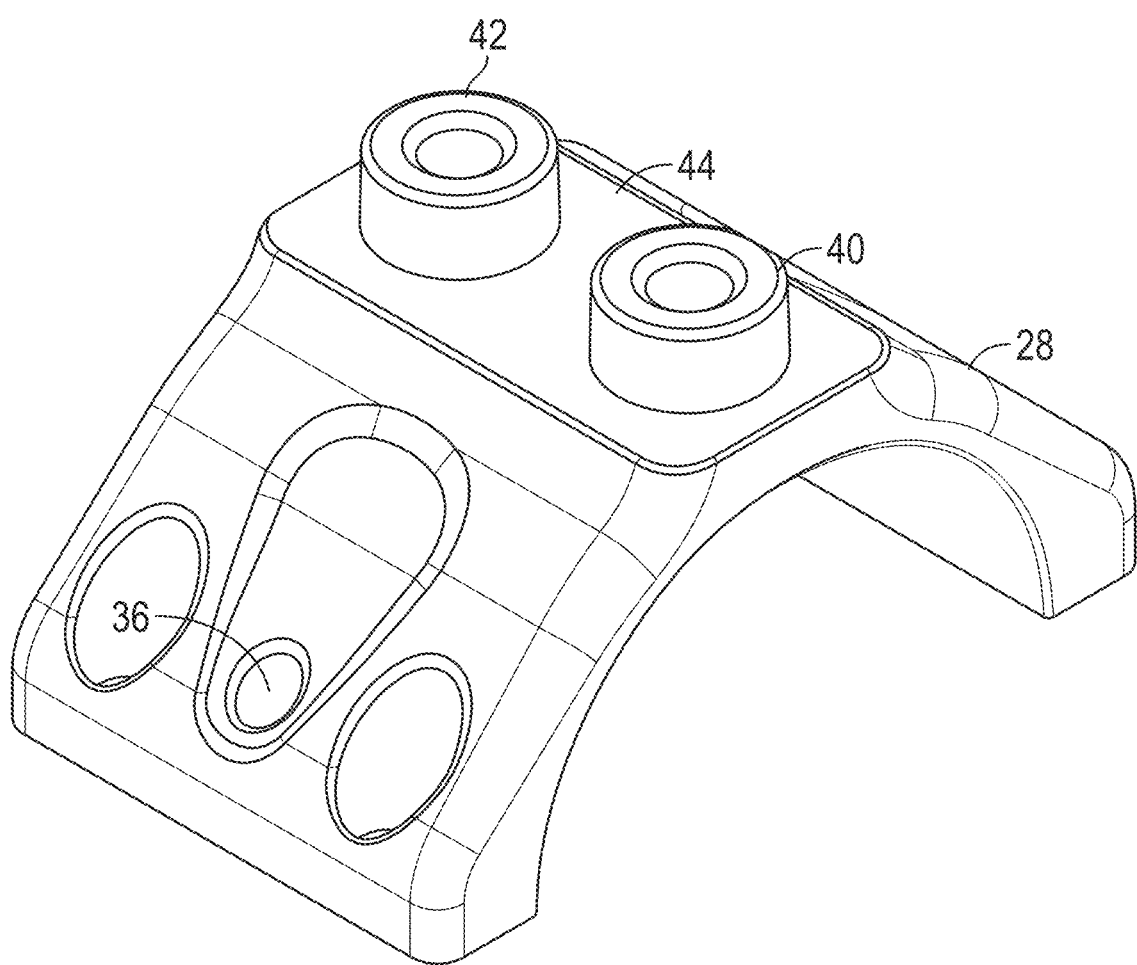
FIG. 5 is a top isometric view of the forward scope ring cap of FIG. 1.
Figure 6A:
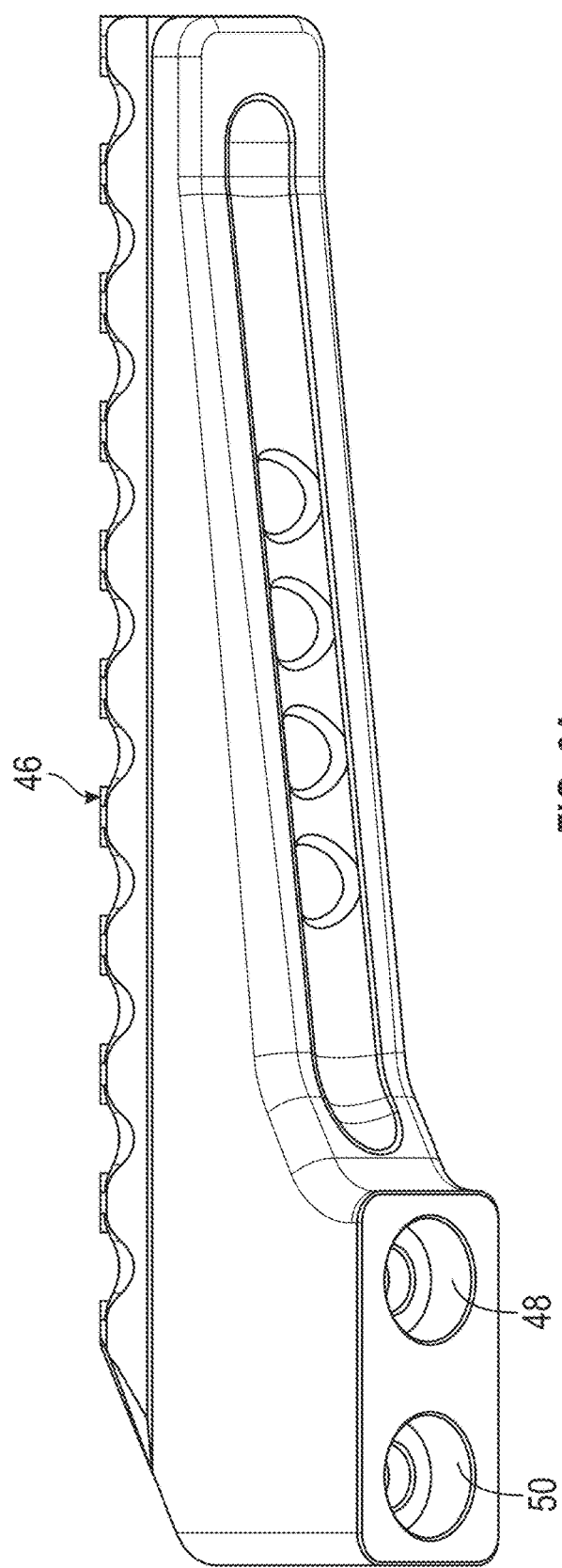
FIG. 6A is a bottom isometric view of the mating accessory of FIG. 1.
Figure 6B:
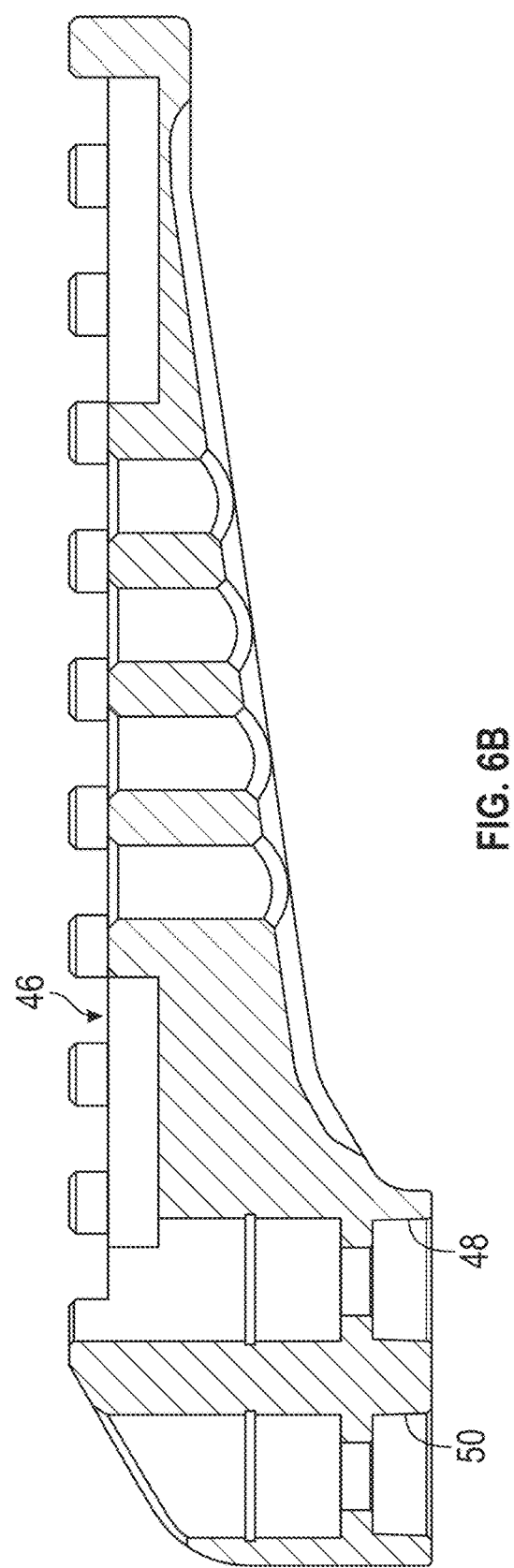
FIG. 6B is a side sectional view of the mating accessory of FIG. 1.
Figure 7:
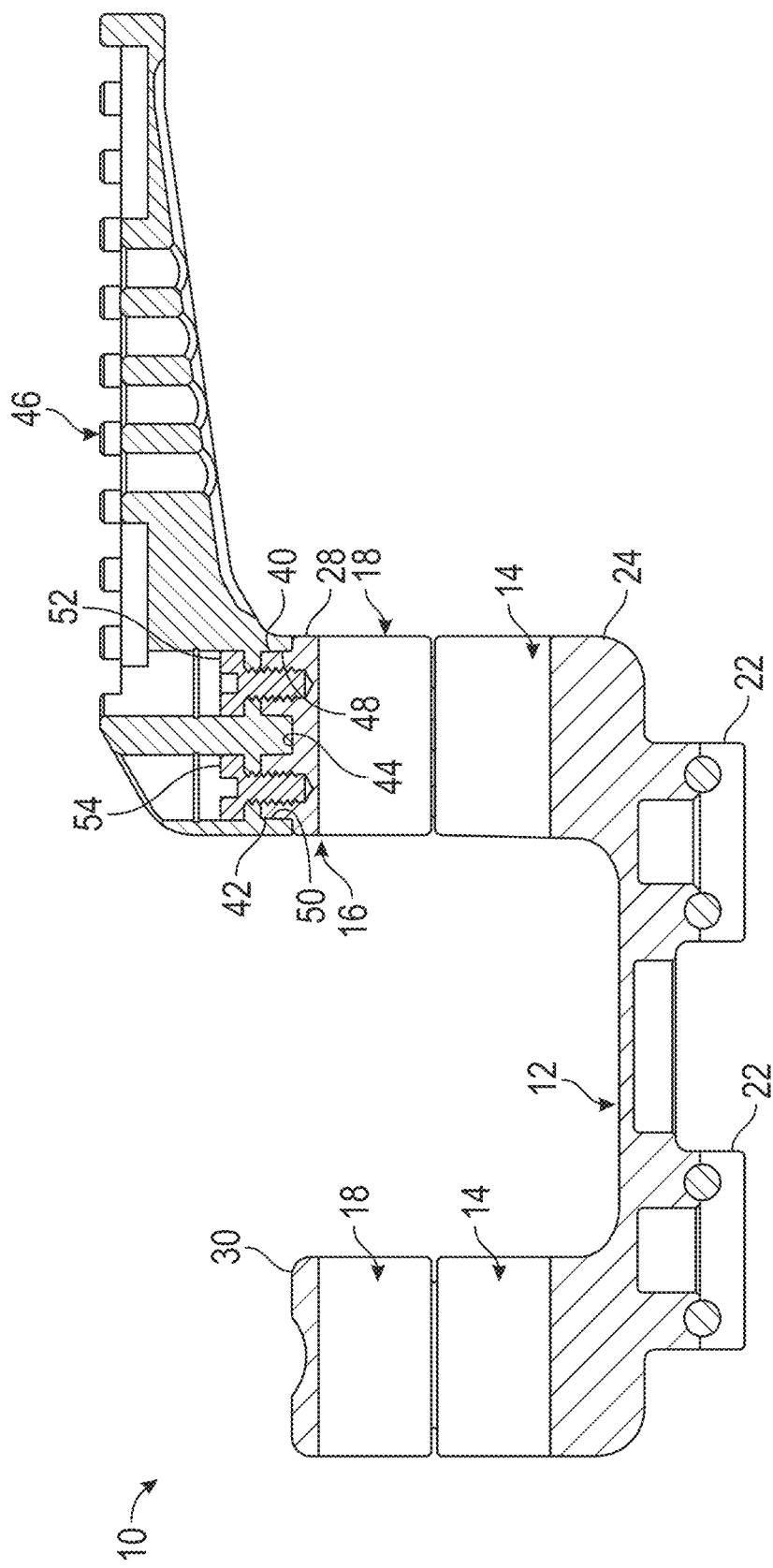
FIG. 7 is a side sectional view of the rifle scope mount of FIG. 1.
Figure 8A:
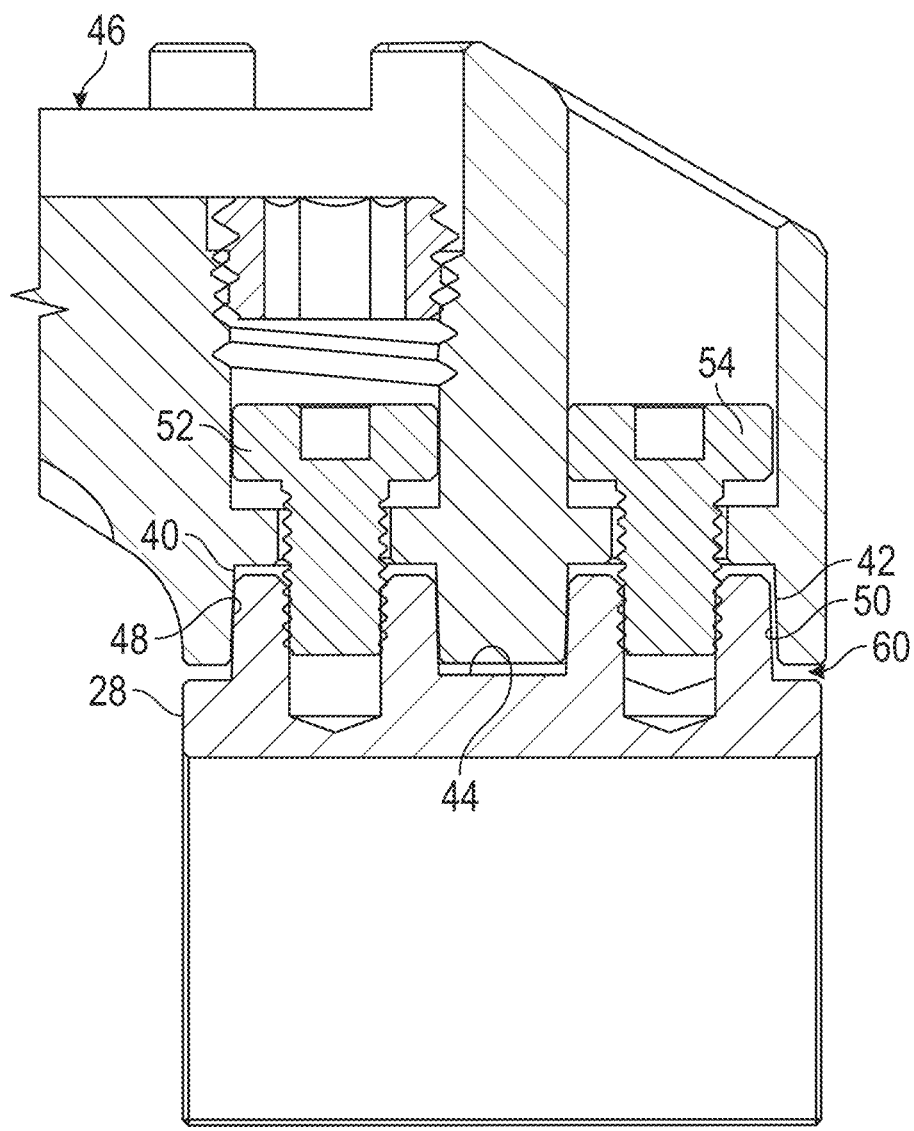
FIG. 8A is an enlarged side sectional fragmentary view of the rifle scope mount of FIG. 1 before the captured screws are tightened.
Figure 8B:
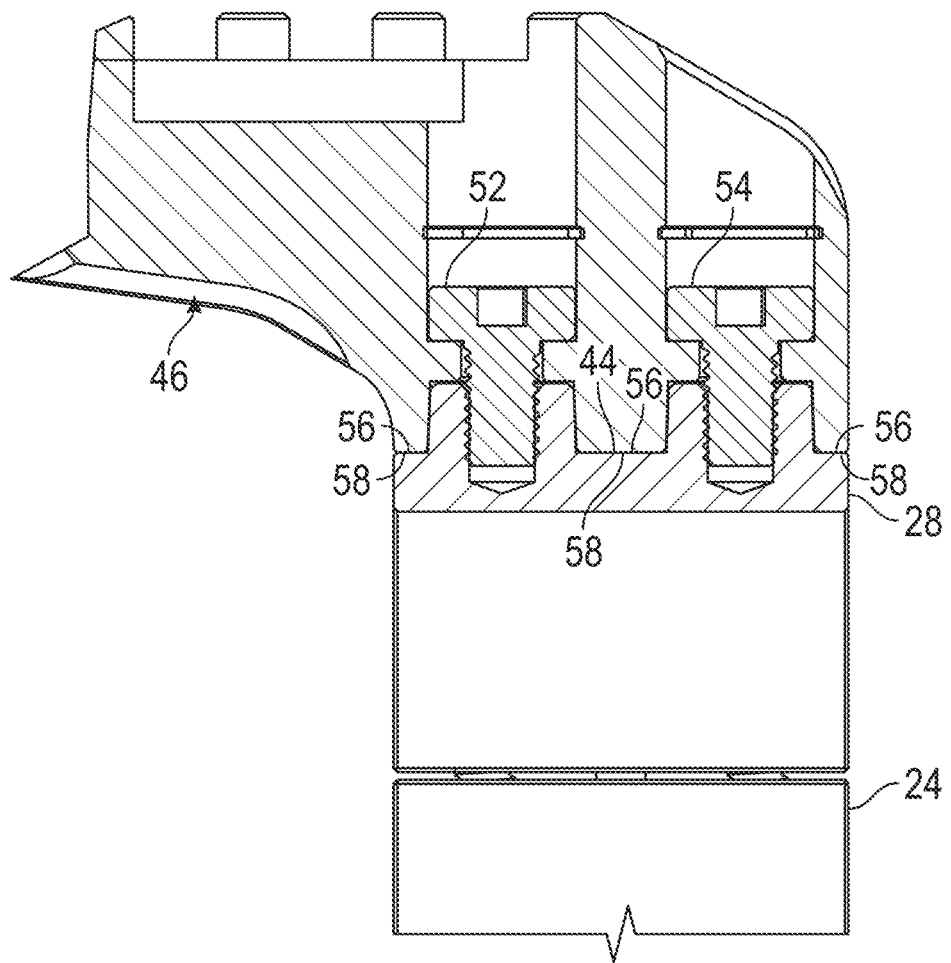
FIG. 8B is an enlarged side sectional fragmentary view of the rifle scope mount of FIG. 1 after the captured screws are tightened.

As is shown most clearly in FIG. 5, tapered male studs 40, 42 protrude from the top 44 of the forward scope ring cap 28. As is shown most clearly in FIGS. 6A & B, a mating accessory 46, which is an extended picatinny rail in the current embodiment, defines tapered female studs 48, 50. By using a shallow male taper for the tapered male studs and a matching shallow taper in the tapered female studs, the mating accessory can be joined to the forward scope ring cap to act as a single unit with a controlled interference fit shown in FIG. 7 resulting in a gap 60 shown in FIG. 8A. Multiple tapered male and female studs are arranged directionally to provide alignment. By drawing the tapers together with captured screws 52, 54 as shown in FIG. 8B, there is contact of flat surfaces 56, 58 between the mating accessory and the top of the forward scope ring cap to resist any variability in pitch or yaw. The captured screws are captured from above, which allows the captured screws to work to push the tightly fitting surfaces apart when the mating accessory needs to be separated from the top of the forward scope ring cap.

Figure 9:
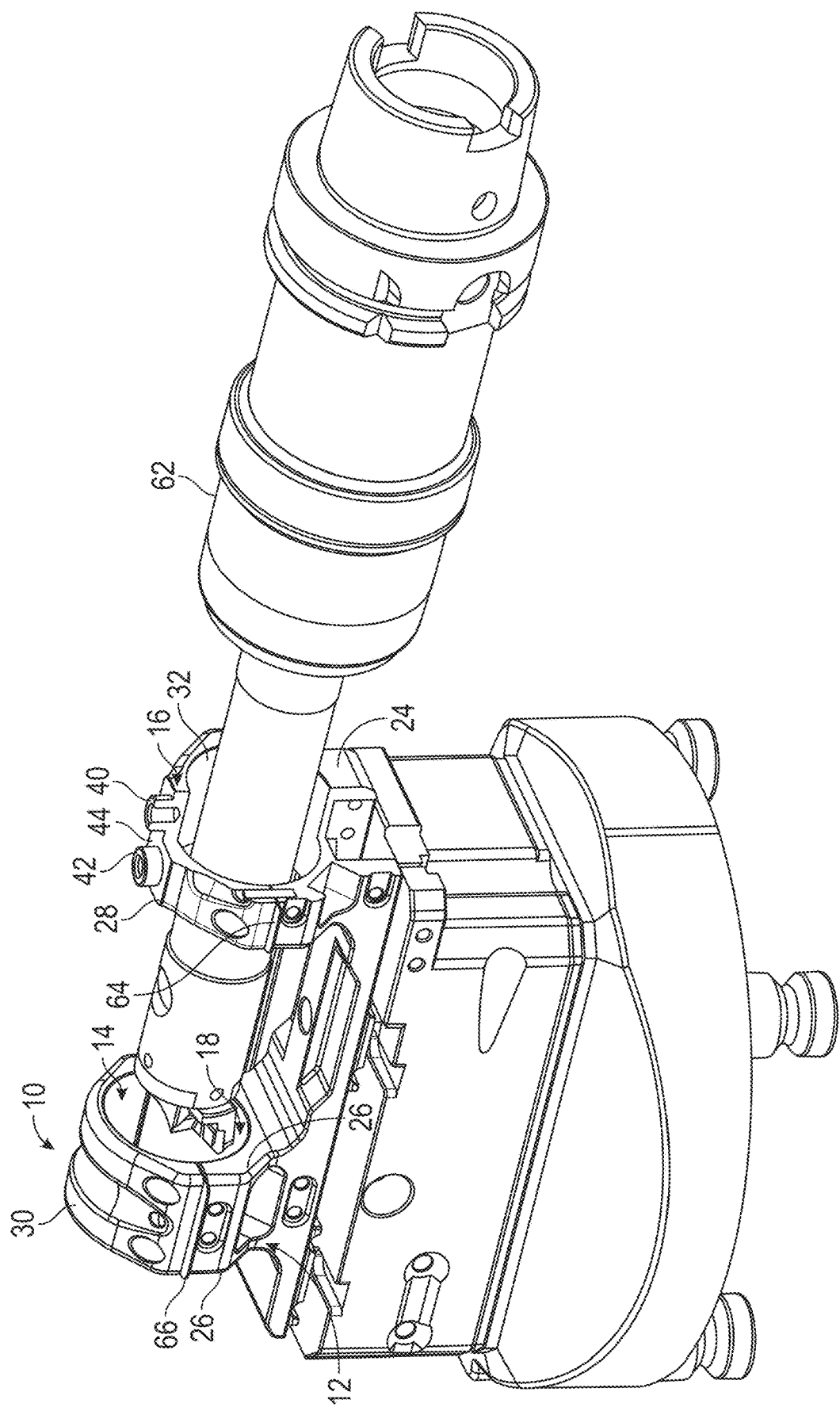
FIG. 9 is a top isometric cutaway view of the rifle scope mount of FIG. 1 attached to a fixture for machining.
Figure 10:
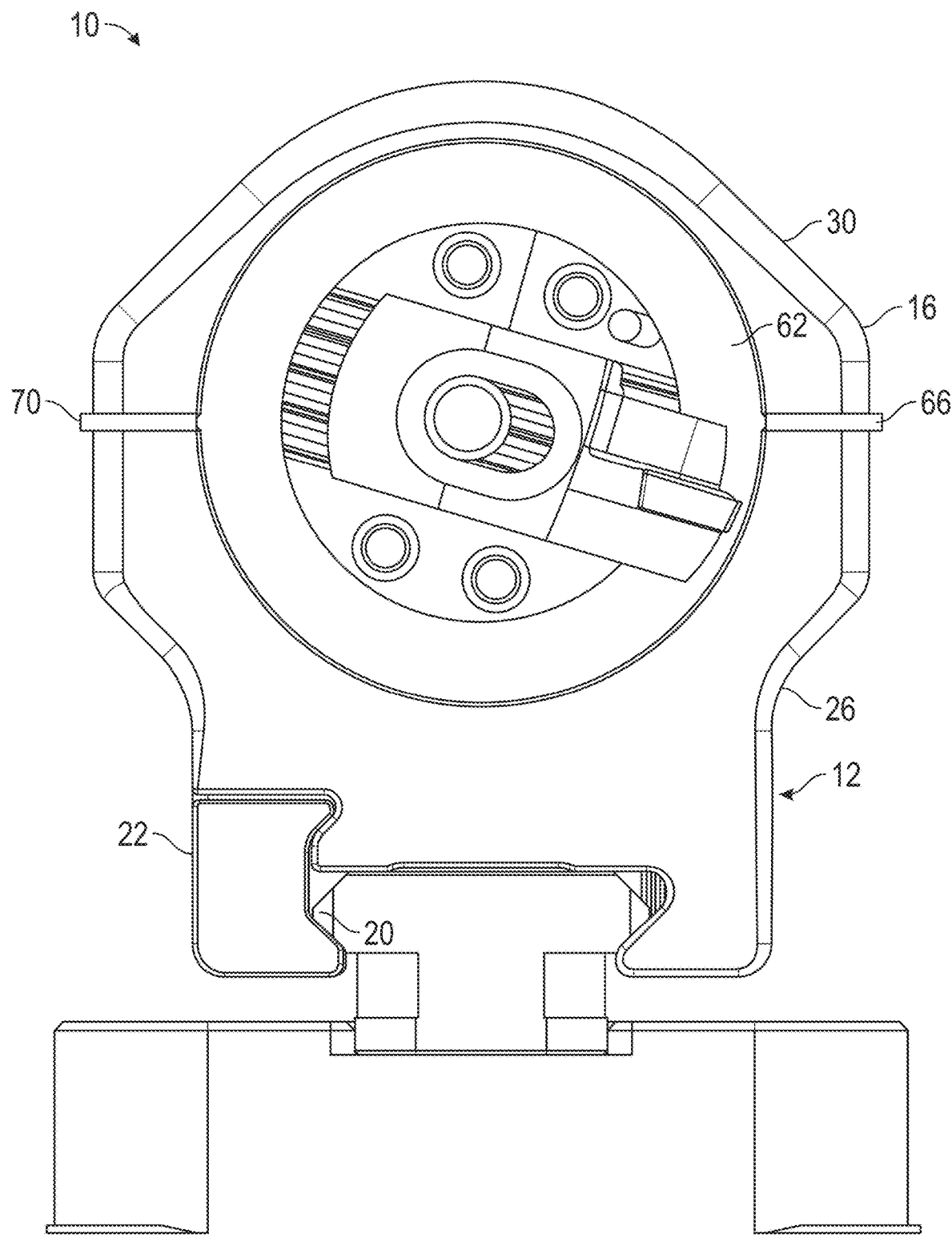
FIG. 10 is an enlarged rear view of the rifle scope mount of FIG. 1 attached to a fixture for machining.
Figure 11:
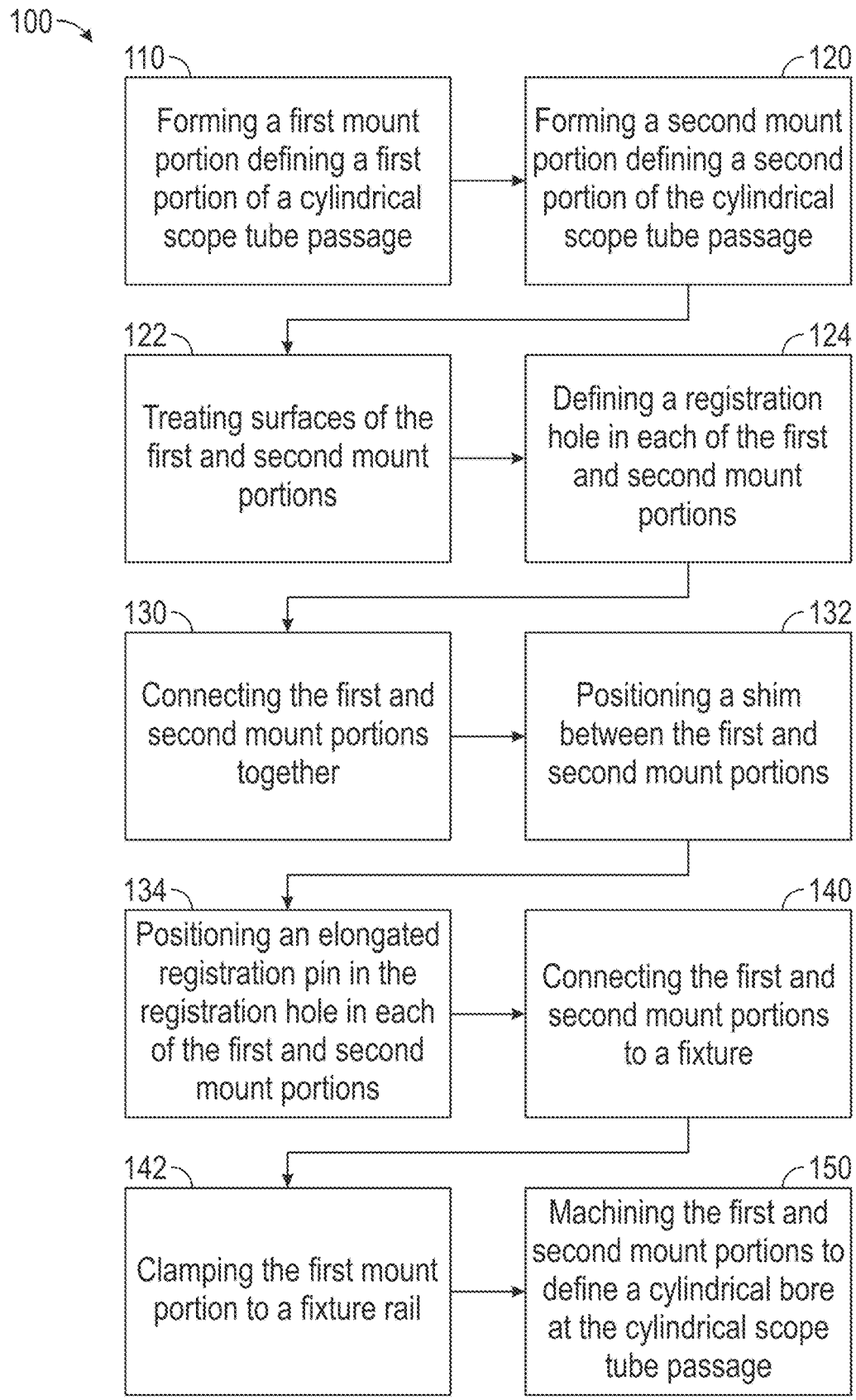
FIG. 11 is a flowchart of the current embodiment of a method of manufacturing a rifle scope mount in accordance with the principles of the present invention.

FIGS. 9-11 illustrate the improved method of manufacturing a rifle scope mount 100 of the present invention. More particularly, FIGS. 9 & 10 show the rifle scope mount 10 in the process of being machined, and FIG. 11 shows the method of manufacturing a rifle scope mount 100. In FIGS. 9 & 10, machining of the first and second mount portions 12, 16 occurs to define a cylindrical bore 32 at the cylindrical scope tube passage 14, 18 that leaves uncoated contact surfaces. A cutting tool 62 is shown in the process of drilling the cylindrical bore. The first mount portion is clamped to a fixture rail 20 during machining, which is in the form of a picatinny rail in the current embodiment. During machining, four shims 64, 66, 68, 70 are located between the first and second mount portions. It should be appreciated that several rifle scope mounts 10 can be mounted to a single fixture rail and bored sequentially.

The method of manufacturing a rifle scope mount 100 includes the steps of forming a first mount portion defining a first portion of a cylindrical scope tube passage (110), forming a second mount portion defining a second portion of the cylindrical scope tube passage (120), after forming the first and second mount portions, connecting the first and second mount portions together (130), connecting the first and second mount portions to a fixture (140), and after connecting the first and second mount portions to a fixture, machining the first and second mount portions to define a cylindrical bore at the cylindrical scope tube passage (150).

The step of connecting the first and second mount portions together (130) can include the step of positioning a shim between the first and second mount portions (132). The step of connecting the first and second mount portions to a fixture (140) can include the step of clamping the first mount portion to a fixture rail (142). The step of treating surfaces of the first and second mount portions (122) can occur after the steps of forming the first and second mount portions (110), (120) and before the step of connecting the first and second mount portions together (130). The step of treating the surfaces of the first and second mount portions (122) can include anodizing.

The steps of forming the first and second mount portions (110), (120) can include the step of defining a registration hole in each of the first and second mount portions (124). The step of connecting the first and second mount portions together (130) can include the step of positioning an elongated registration pin in the registration hole in each of the first and second mount portions (134). The step of a defining a registration hole in each of the first and second mount portions (124) can include defining a different sized hole in each of the first and second mount portions, such that the elongated registration pin is more readily removed from one registration hole than the other registration hole.

The step of forming the first mount portion (110) can include forming a forward scope ring cradle and a rear scope ring cradle. The step of forming the second mount portion (120) can include forming a forward scope ring cap and forming a rear scope ring cap. The step of machining the first and second portions to define a cylindrical bore (150) can include machining the forward scope ring cradle and forward scope ring cap and the rear scope ring cradle and rear scope ring cap while maintaining the fixture in a fixed position. The step of machining the first and second mount portions to define a cylindrical bore (150) can include machining the forward scope ring cradle and forward scope ring cap and the rear scope ring cradle and rear scope ring cap in a single machining operation, where the single machining operation is a single pass of a cutting tool.

In the context of the specification, the terms "rear" and "rearward," and "front" and "forward," have the following definitions: "rear" or "rearward" means in the direction away from the muzzle of the firearm while "front" or "forward" means it is in the direction towards the muzzle of the firearm.

While a current embodiment of a method of manufacturing a rifle scope mount has been described in detail, it should be apparent that modifications and variations thereto are possible, all of which fall within the true spirit and scope of the invention. Although rifles have been disclosed, the method of manufacturing a rifle scope mount is also suitable for use with shotguns, light and medium machine guns, and other firearms. Furthermore, the method is suitable to produce a rifle scope mount as either a uni-mount or as a rifle scope mount with separate rings. In addition, although the fixture rail having the form of a picatinny rail has been disclosed, the fixture rail can be any suitable mounting style, including a 30 mm dovetail. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of manufacturing a rifle scope mount, the method comprising the steps of:

forming a first mount portion defining a first portion of a cylindrical scope tube passage:

forming a second mount portion defining a second portion of the cylindrical scope tube passage;

after forming the first and second mount portions, connecting the first and second mount portions together;

after connecting the first and second mount portions together, connecting the first and second mount portions to a fixture; and after connecting the first and second mount portions to a fixture, machining the first and second mount portions to define a cylindrical bore at the cylindrical scope tube passage.

2. The method of claim 1 wherein the step of connecting the first and second mount portions together includes positioning a shim between the first and second mount portions.

3. The method of claim 1 wherein the step of connecting the first and second mount portions to a fixture includes clamping the first mount portion to a fixture rail.

4. The method of claim 3 wherein the fixture rail has the form of a picatinny rail.

5. The method of claim 1 wherein the first mount portion is a base including a clamp operable to mount to a firearm.

6. The method of claim 1 wherein the second mount portion is a scope ring cap.

7. The method of claim 1 including after the step of forming the first and second mount portions and before connecting the first and second mount portions together, treating surfaces of the first and second mount portions.

8. The method of claim 7 wherein the step of treating the surfaces of the first and second mount portions includes anodizing.

9. The method of claim 1 wherein the step of forming the first and second mount portions includes defining a registration hole in each of the first and second mount portions.

10. The method of claim 9 wherein the step of connecting the first and second mount portions together includes positioning an elongated registration pin in the registration hole in each of the first and second mount portions.

11. The method of claim 9 wherein defining a registration hole in each of the first and second mount portions includes defining a different sized hole in each of the first and second mount portions, such that the elongated registration pin is more readily removed from one registration hole than the other registration hole.

12. The method of claim 1 wherein the step of forming the first mount portion includes forming a forward scope ring cradle and a rear scope ring cradle, and the step of forming the second mount portion includes forming a forward scope ring cap and forming a rear scope ring cap, and wherein the step of machining the first and second portions to define a cylindrical bore includes machining the forward scope ring cradle and forward scope ring cap and the rear scope ring cradle and rear scope ring cap while maintaining the fixture in a fixed position.

13. The method of claim 12 including wherein machining the first and second mount portions to define a cylindrical bore includes machining the forward scope cradle and forward scope ring cap and the rear scope ring cradle and rear scope ring cap in a single machining operation.

14. The method of claim 13 wherein the single machining operation is a single pass of a cutting tool.

* * * * *